Oct. 13, 1931.     L. S. WILBUR     1,826,972
SHOCK ABSORBER
Filed May 5, 1927     4 Sheets-Sheet 2
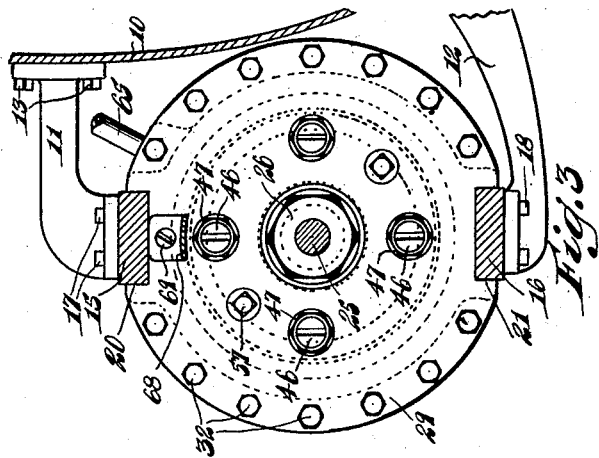
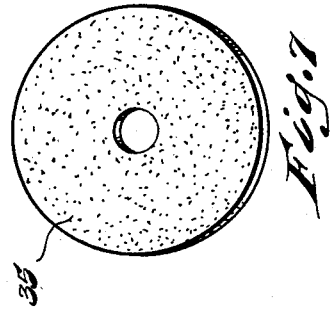
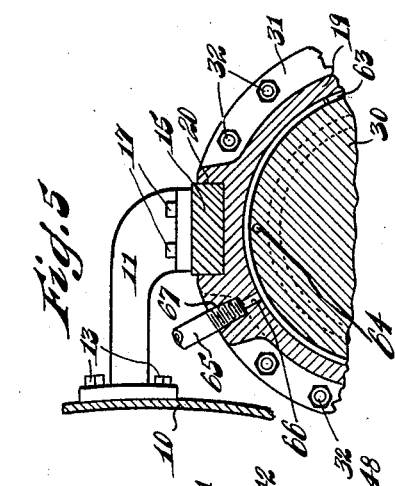
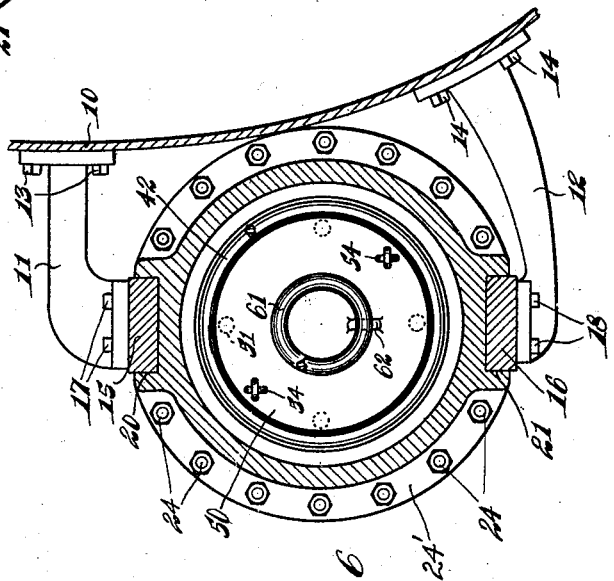
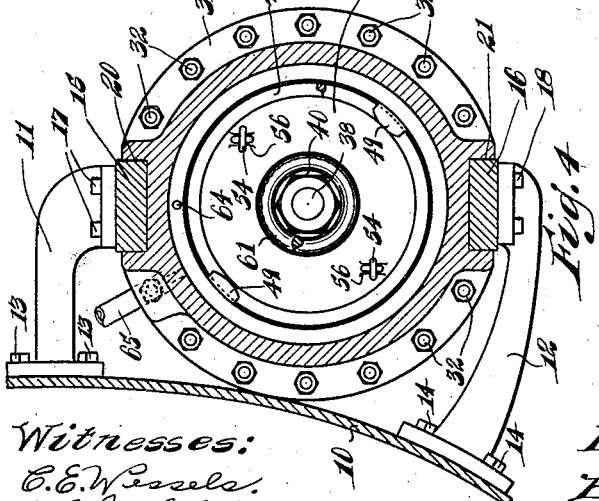
Witnesses:
C. E. Wessels
F. C. Appleton
Inventor:
Lawrence S. Wilbur,
By Joshua R H Potk
his Attorney.

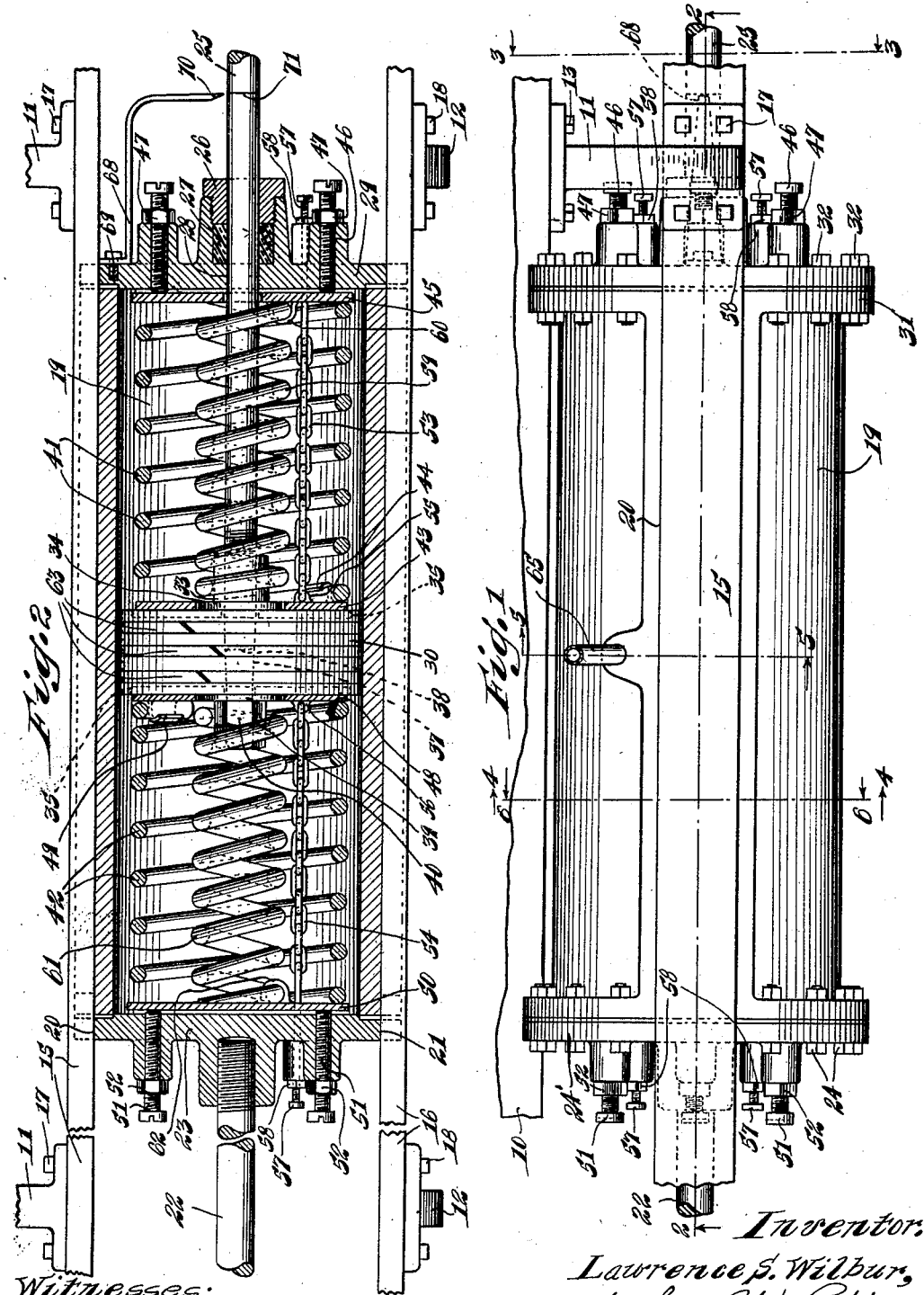

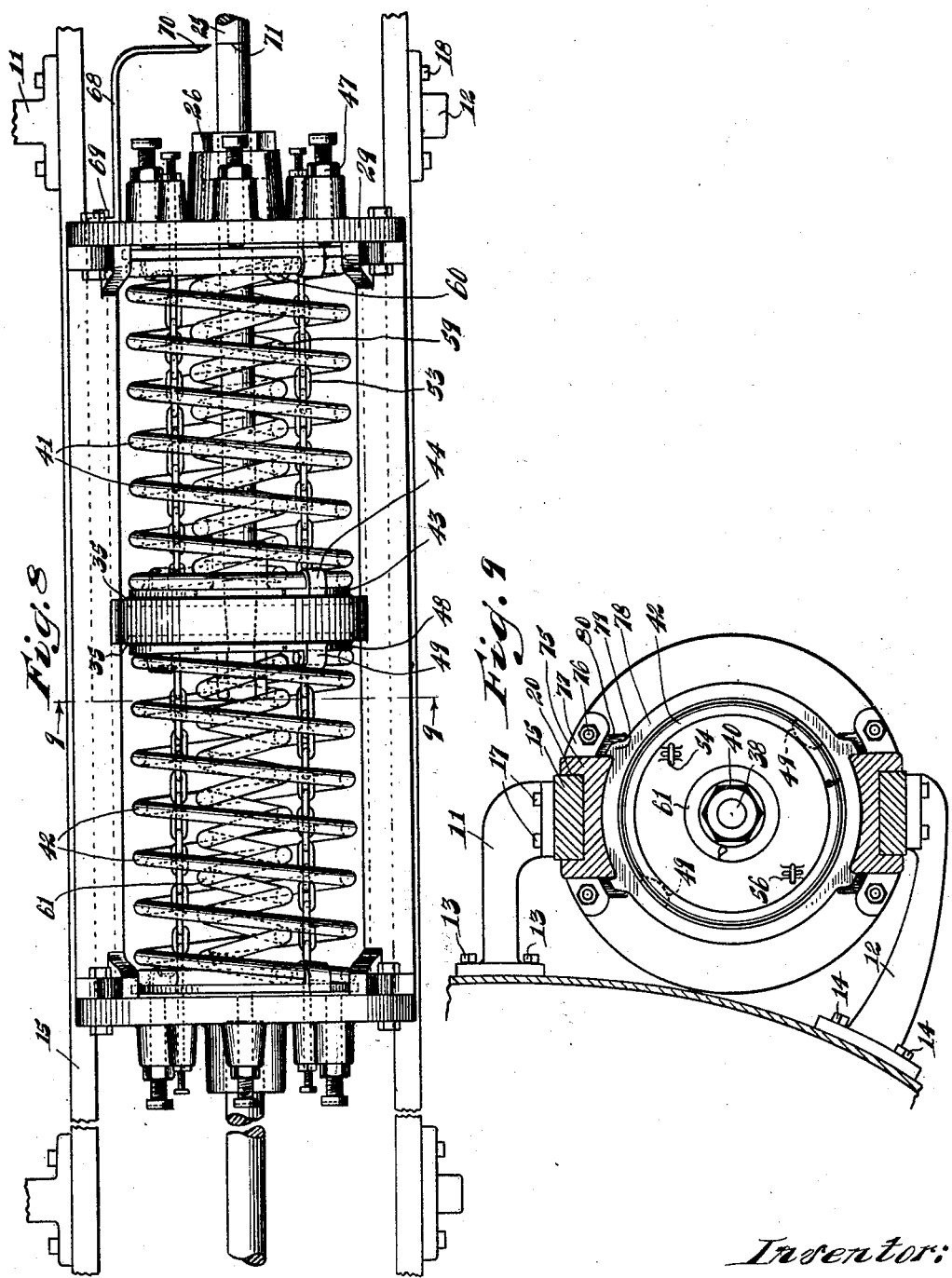

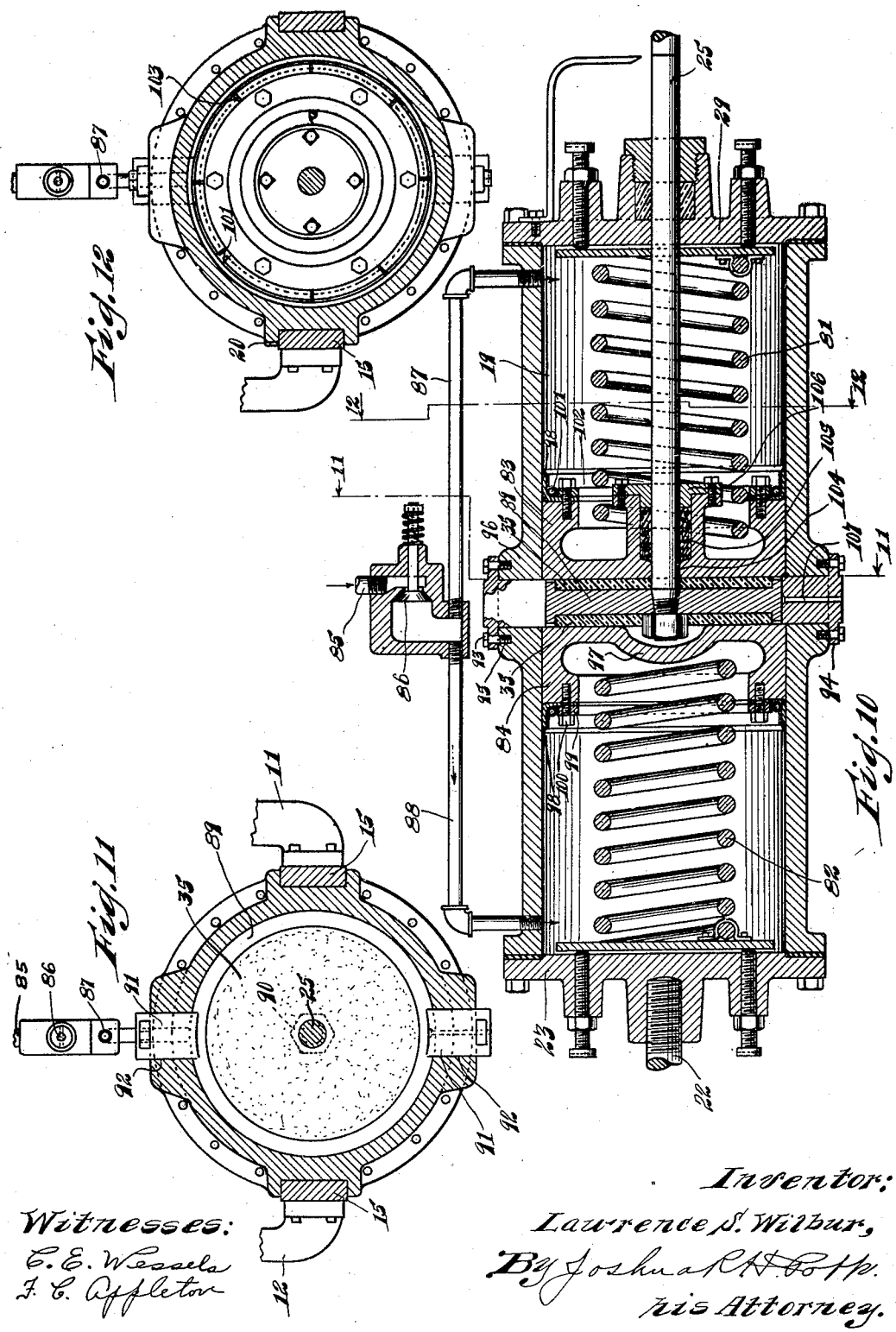

Patented Oct. 13, 1931

1,826,972

UNITED STATES PATENT OFFICE

LAWRENCE S. WILBUR, OF EVANSTON, ILLINOIS

SHOCK ABSORBER

Application filed May 5, 1927. Serial No. 189,130.

My invention relates to a shock absorber and more particularly to a shock absorber or cushioning device adapted to be used in the reach rod of a locomotive for preventing strain on the operator, or such mechanism as may be positioned between the valve gear mechanism of the quadrant lever, such, for instance, as a reverse gear which is normally positioned just ahead of the quadrant lever on the reach rod.

The object of my invention is to provide a device of the above indicated character, which is adapted to absorb the shocks given to the reach rod by means of the valve and valve mechanism, and to prevent such shocks from being transmitted along said reach rod to the power reverse gear or to the operator of the quadrant lever. Another object of my invention is to provide a device of the above indicated character of an improved construction comprising a movable cylinder, having a piston positioned and normally held in the center thereof, and means for resiliently retaining said piston in the center of said cylinder for holding the piston rod and the valve gear mechanism secured thereto, in a definite position; guide members on the side of said locomotive along which said cylinder is adapted to be reciprocated, and an indicating device for showing when the piston is in the center of the cylinder, and means for adjusting the resilient means for holding said piston in the center of said cylinder.

My invention will be best understood by reference to the accompanying drawings forming a part of this specification, and in which, Figure 1 is a top plan view of a shock absorber incorporating my invention and Figure 2 is a sectional view taken on approximately the line 2—2 of Figure 1. Figure 3 is a cross-sectional view taken on substantially the line 3—3 of Figure 1 and Figure 4 is a cross-sectional view taken on substantially the line 4—4 of Figure 1. Figure 5 is a fragmental sectional view taken on substantially the line 5—5 of Figure 1, and Figure 6 is a cross-sectional view taken on substantially the line 6—6 of Figure 1. Figure 7 is a perspective view of a cushioning device employed in my invention.

Figure 8 is an elevational view of a modification of my invention and Figure 9 is a sectional view taken on line 9—9 of Figure 8. Figure 10 is an elevational sectional view of other modifications of my invention. Figure 11 is a sectional view taken on line 11—11 of Figure 10 and Figure 12 is a sectional view taken on line 12—12 of Figure 10.

In the drawings and for the purpose of illustration I have shown the preferred embodiment of my invention, in which 10 represents the boiler plate on the side of a locomotive, and having arms 11 and 12 secured thereto by bolts 13 and 14, respectively. Said arms have guide members 15 and 16 secured in opposing relation to each other by means of suitable bolts 17 and 18, respectively. A cylinder 19 is provided with slots or guideways 20 and 21, in which said guide members are adapted to fit, and said cylinder may be reciprocated along said guide members by means of the rearward end 22 of the usual locomotive reach rod. Said member 22 is suitably secured to a removable head member 23, which is normally secured in position on the rearward end of said cylinder 19 by means of a plurality of bolts 24 positioned around the circumference thereof and passing through the flange 24'. The forward portion 25 of said locomotive reach rod passes through a packing nut 26, a packing 27 and an opening 28 in the end of the removable cylinder head 29, and into the cylinder 19 to a piston 30.

The removable cylinder head 29 is normally secured to a flange 31 of said cylinder 19 by means of a plurality of bolts 32 positioned around the circumference thereof. The portion 25 of the reach rod is provided with a boss 33 having a flange 34 thereon for engaging a disc 35 of rubber or other similarly resilient material, which is positioned in one end of the piston 30, and the member 25 passes through said disc 35 and is tapered to fit within a tapered opening 37 in said piston. The smaller end of the tapered portion 38 of said member 25 has screw thread engagement with a nut 40. Said nut 40 engages a washer 39, which engages a disc member 35 as shown in Figure 7, and by means of the nut 40 the flange 34 on the boss 33 and the washer 39, the piston 30 is securely held in position on the rearward end of said portion 25 of the reach rod.

Coil spring members 41 and 42 are positioned between the piston and the cylinder heads 29 and 23, respectively, for resiliently urging said piston toward the center of said cylinder. The inner end of coil spring 41 engages a plate 43 and is normally secured in position thereon by a lug member 44. The other end of said spring 41 engages a plate 45, which may be adjusted relative to the cylinder head 29 by means of set screws 46 having lock nuts 47 thereon. In a like manner the spring 42 engages a plate 48 and is normally secured thereto by lugs 49. The other end of said spring 42 engages a plate 50, which is adapted to be adjusted relative to the cylinder head 23 by means of set screws 51, having lock nuts 52 positioned thereon. Chain members 53 and 54 are secured to plates 43 and 48 by means of lug members 55 and 56, respectively, and said chain members are provided with adjusting means 57, having lock nuts 58 thereon for the purpose of limiting the inward movement of the springs 41 and 42.

Coiled around the portion 25 of the reach rod within the cylinder 19 is provided an auxiliary spring 59, which has one end secured to the plate 45 by means of an eye member 60 integral with said plate. The other end of said spring 59 is adapted to fit over said boss 33, and when the piston 30 moves sufficiently toward the cylinder head 29, the end of spring 59 engages the flange 34 on said boss. Similarly a coil spring 61 engages and is secured to the plate 50 by means of an eye member 62 integral with said plate. The other end of said spring 61 passes around the nut 40 and is adapted to engage the washer 39 when the piston 30 moves sufficiently in the direction toward the cylinder head 23. Since the discs 35 are positioned between the plates 43 and 48, it is obvious that the pressure of the springs 41 and 42 is evenly distributed over said cushioning members, which eliminates noise which would otherwise result in chattering of the metallic plates against the piston 30.

The piston 30 is provided with suitable piston rings 63, which prevent a sudden rush of air by said piston but permit air to gradually leak by the same for equalizing the air pressure, which may be created on both sides of the piston. Through the piston 30 is provided an air duct 64, which has for its purpose to allow air pressure to equalize within said cylinder to gradually equalize on both sides of said piston. A tube 65, which normally supplies air pressure through an opening 66 to said cylinder, is secured to the same by screw thread engagement in an opening 67. On the forward cylinder head 29 is secured an indicator 68 by means of a set screw 69. Said indicator is provided with a point 70, which is positioned directly above a crease 71 in the portion 25 of said reach rod when the piston is in exactly the center of the cylinder 19, and the purpose of said indicator is to aid in adjusting the tension of the springs within said cylinder in order that the piston will be urged to the center of the cylinder whenever it has been displaced therefrom.

In the normal operation of my invention the portion 22 of the reach rod of the locomotive is moved forward or backward for positioning the valves of the locomotive, and my invention is simply a novel shock absorbing means included within the length of said rod, and when the portion 22 is moved in one direction it positions the cylinder at some point along the guide members 15 and 16 and it remains in that position until again moved by the operation of said portion 22. When the cylinder is moved, the springs 41 and 42, which engage the piston 30, cause the piston to move along with the cylinder and, thereby, moves the portion 25 of the reach rod. If for any reason a shock or a jerk is received by the portion 25 of said rod it is transmitted to the piston 30, which is suddenly forced one way or the other in said cylinder, but when it moves toward the spring 42 it is restrained by said spring, and at the same time the chain 53 prevents the spring 41 from exerting any force upon the piston. Therefore, the spring 42, having no opposition quickly returns the piston to the center of the cylinder, and in case the shock is very severe the piston may be forced endwise far enough to engage the end of spring 61, which is of very rigid construction, and prevents excessive motion of the piston. In case the piston is pulled forwardly toward spring 41 the action is obviously the exact reverse, and the tendency at all times is to keep the piston 30 directly in the center of the cylinder 19. In addition to the spring action I have provided the pipe 65, through which air under pressure may be forced into the cylinder, and said air will leak by the piston rings 63 and into both ends of said cylinder, thereby, affording an increased cushioning means for the piston. The device as a whole when in operation prevents the creeping of the portion 25 of the reach rod, and in addition to this function, it allows certain temporary restrained movement of said portion 25 and thereby protects mechanism secured thereto, from excessive strain and at the same time absorbs all shock received by said portion 25, and protects mechanism which may be positioned along the rearward portion 22 of said rod.

In Figures 8 and 9 is shown a modification of my invention, which consists of substantially the same elements in the same relation to each other, with certain variations, in that no cylinder is used in Figures 8 and 9 and the heads 29 are secured to channel members 75 by means of bolts 76 through flanges 77 on the sides thereof at each end of said channel members. The channel members 75 are provided with guideways 20, as hereinbefore described, and the guide members 15 are adapted to fit in and reciprocate therein. In this modification of my invention a crosshead 78 is employed in the place of the piston 30, and said crosshead is provided with ears 79 which act as guide members for preventing the crosshead from being forced out of position. Adjacent the ends of the channel members 75 are reinforcing side flanges 80 integral therewith.

The same springs and chains are used in this form of my invention and the operation is substantially that described hereinbefore with the exception that compressed air is not employed as an auxiliary cushioning means since the interior of the mechanism as shown in Figures 8 and 9, is open to the atmosphere.

In Figures 10, 11, and 12, is shown another modification of my invention with certain variations from that disclosed in Figures 1 to 7 inclusive, as follows; the same type of cylinder 19 is employed and having the same cylinder heads 23 and 29. The cylinder is provided with the guideways 20 adapted to reciprocate on the guide members 15 as previously described, but in this form of my invention the usual coil springs have been omitted and emergency coil springs 81 and 82 are employed, which are positioned in the cylinder 19 in order that they may be adjusted into contact with the floating pistons 83 and 84 respectively, in case the air pressure supply, by which this form of my invention is normally operated, should fail.

An air supply pipe 85 leads from a suitable air pressure reservoir, not shown, to the check valve 86 of any usual type, which causes the air pressure in the cylinder 19 to be of a reduced pressure from that supplied in the pipe 85. Pipes 87 and 88 lead to the ends of the cylinder 19 and thereby permit free communication from the valve 86 to both ends of the cylinder and from the free communication of air pressure from one end of the cylinder 19 to the other end, and it is therefore obvious that the air pressure in both ends of cylinder 19 is at all times equal. On the end of the portion 25 of the reach rod is secured a thin one-piece piston 89 by means of the nut 80. Said piston 89 is adapted to receive cushioning members 35 in both sides thereof and the floating pistons 83 and 84 are adapted to engage said members 35 for preventing noise and eliminating vibration.

Stop members 91 are positioned in openings 92 through the sides of said cylinder 19 and are held in place by suitable bolts 93 which pass through flanges 94 on said stop members and have screw thread engagement in openings 95 provided in the thickened portion 96 on the sides of the cylinder 19, provided for that purpose.

The floating pistons 83 and 84 are normally held in contact with said cushioning member 35 by means of fluid pressure within the cylinder 19. The floating piston 84 is provided with a raised portion 97 for passing over the nut 90 in order that said piston may be complete and air tight across its diameter, and in order to make a substantially air tight fit in the cylinder 19, said floating piston 84 is provided with a cup 98 having its inner edge held in place by a ring member 99, which is clamped down upon the inner edge of said cup 98, by means of suitable bolts 100. Within the cup 98 is positioned an expansion ring 101, which is provided with a sheath 102 of metal having a flange which is broken at various intervals, as at 103, in order that said flange may be pressed outwardly against said cup member 98 for holding the same into substantially fluid tight relationship with the sides of the cylinder 19. The floating piston 83 is provided with an opening 104 through which the portion 25 is permitted to pass and this construction necessitates the use of packing material 105 which is held in place by the cover plate 106 in any satisfactory manner. The floating piston 83 is provided with a cup 98, and the same means for holding it in place and in operative relation with the sides of cylinder 19, as hereinbefore described for piston 84.

The operation of this form of my invention is substantially the same as described for the other forms of my invention, with the exception that the springs 81 and 82 have no normal operating function, but are to be used as emergency springs only, and the pistons 83 and 84 are consistently urged to the inward limit of their pistons into contact with the stop member 91 and the cushioning members 35 by means of air pressure which is supplied through the pipe 85. When the cylinder 19 is moved along the guide members 15 which are secured to the locomotive by arms 11 and 12, the floating pistons tend to retain the piston 89 in exactly the center of the cylinder and it in turn moves the forward portion 25 of the reach rod to the position desired. When for any reason, the portion 25 is suddenly forced out of position, in either direction, the floating pistons 83 and 84 operating upon the piston 89 immediately return said piston to the center of the cylinder and thereby prevent creeping of the portion 25 and accomplish the same purpose as explained in the operation of the form of my invention described in Figures 1 to 7 inclusive. In this connection it should be noted that I have provided a duct 107 through one of the stop members 91 for the purpose of permitting air to pass into or out of the space between the two floating pistons, and thereby prevent air pressure building up within said space, which would obviously impede the operation of this device.

While I have described my invention in its preferred form, it is obvious that it is capable of variations without departing from the spirit of my invention. I do not therefore desire to be limited to the precise details of construction described and illustrated but desire to avail myself of such variations and modifications as come within the scope of the appended claims.

I claim as my invention:

1. A shock absorbing device for a locomotive reach rod; said rod having a front portion and a rear portion; a slidably mounted cylinder provided with two cylinder heads; one of said cylinder heads secured to one of said portions and movable therewith; a piston slidably mounted in said cylinder and secured to the other of said portions; resilient means disposed on each side of said piston between said piston and said cylinder heads; and means connected to said cylinder heads for confining the amplitude of movement of said resilient means.

2. A shock absorbing device for a locomotive reach rod; said rod having a front portion and a rear portion; a cylinder having two cylinder heads; one of said cylinder heads secured for movement with one of said portions; the other of said portions passing through the other said cylinder head and secured to a piston within said cylinder, and shock absorbing means interposed between said piston and said cylinder heads; said shock absorbing means comprising a plurality of pairs of concentrically positioned coil springs, one of said pairs of concentrically positioned springs being more resistant to compression than the other of said pair of concentrically positioned springs and means for limiting the range of action for said springs; said cylinder mounted for reciprocatory movement relative to said locomotive.

3. A shock absorbing device comprising a cylinder having two heads removably secured thereto; said cylinder having guideways in the sides thereof; guide members rigidly secured to a locomotive and positioned in said guideways for permitting reciprocatory movement of said cylinder relative to said locomotive; a rear portion of a locomotive reach rod secured to one of said heads for movement therewith; a piston in said cylinder; a front portion of a locomotive reach rod passing through one of said heads and secured from movement with said piston; shock absorbing spring members interposed between said piston and said heads.

4. A shock absorbing device comprising a cylinder having two heads removably secured thereto; said cylinder having guideways in the sides thereof; guide members rigidly secured to a locomotive and positioned in said guideways for permitting reciprocatory movement of said cylinder relative to said locomotive; a rear portion of a locomotive reach rod secured to one of said heads for movement therewith; a piston in said cylinder; a front portion of a locomotive reach rod passing through one of said heads and secured from movement with said piston; shock absorbing spring members interposed between said piston and said heads; and means including chains connected to said heads and said shock absorbing spring members for limiting the range of action of said shock absorbing members.

5. A shock absorbing device for a locomotive reach rod; said rod having a front portion and a rear portion; a cylinder having cylinder heads removably secured to the ends thereof; a piston slidably mounted in said cylinder; said rear portion secured for movement with one of said cylinder heads; said front portion passing through the other said cylinder head and being secured for movement with said piston; coil springs interposed between said piston and said cylinder heads; plates interposed between said coil springs and said cylinder heads; and means for varying the force exerted by said springs against said piston.

6. A shock absorbing device for a locomotive reach rod; said rod having a front portion and a rear portion; a cylinder having cylinder heads removably secured to the ends thereof; a piston slidably mounted in said cylinder; said rear portion secured for movement with one of said cylinder heads; said front portion passing through the other said cylinder head and being secured for movement with said piston; coil springs interposed between said piston and said cylinder heads; plates interposed between said coil springs and said cylinder heads; and means for varying the force exerted by said springs against said piston; adjustable means for limiting the extension of said coil springs.

7. A shock absorbing device for a locomotive reach rod; said rod having a front portion and a rear portion; a cylinder having cylinder heads removably secured to the the ends thereof; a piston slidably mounted in said cylinder; said rear portion secured for movement with one of said cylinder heads; said front portion passing through the other said cylinder head and secured for movement with said piston; coil springs interposed between said piston and said cylinder heads; resilient disc members seated in the faces of said piston, and plate members engaging said springs and said resilient disc members.

8. A shock absorbing device for a locomotive reach rod; said rod having a front portion and a rear portion; a cylinder having cylinder heads removably secured to the ends thereof; a piston slidably mounted in said cylinder; said rear portion secured for movement with one of said cylinder heads; said front portion passing through the other said cylinder head and secured for movement with said piston; coil springs interposed between said piston and said cylinder heads; resilient disc members seated in the faces of said piston, and plate members engaging said springs and said resilient disc members; chains adjustably secured to said plate members for limiting the extension of said springs.

9. A shock absorbing device for a locomotive reach rod; said rod having a front portion and a rear portion; a cylinder having cylinder heads removably secured to the ends thereof; a piston slidably mounted in said cylinder; said rear portion secured for movement with one of said cylinder heads; said front portion passing through the other said cylinder head and secured for movement with said piston; coil springs interposed between said piston and said cylinder heads; resilient disc members seated in the faces of said piston, and plate members engaging said springs and said resilient disc members; chains adjustably secured to said plate members for limiting the extension of said springs; plates interposed between said coil springs and said cylinder heads; and means for adjusting the position of each of said plates for varying the force exerted by said springs against said piston.

10. A shock absorbing device for a locomotive reach rod; said rod having a front portion and a rear portion; a cylinder having cylinder heads removably secured to the ends thereof; a piston slidably mounted in said cylinder; said rear portion secured for movement with one of said cylinder heads; said front portion passing through the other said cylinder head and secured for reciprocatory movement with said piston; spring means interposed between said piston and said cylinder heads; plates interposed between said spring means and said cylinder heads; means for adjusting the position of each of said plates; resilient disc members seated in the faces of said piston and plate members engaging said spring means and resilient disc members; chains each having one end secured to said plate members and the other end adjustably secured to one of said cylinder heads, for limiting the extension of said spring means.

11. A shock absorbing device for a locomotive reach rod; said rod having a front portion and a rear portion; a cylinder having cylinder heads removably secured to the ends thereof; a piston slidably mounted in said cylinder; said rear portion secured for movement with one of said cylinder heads; said front portion passing through the other said cylinder head and secured for reciprocatory movement with said piston; spring means interposed between said piston and said cylinder heads; plates interposed between said spring means and said cylinder heads; means for adjusting the position of each of said plates; resilient disc members seated in the faces of said piston and plate members engaging said spring means and resilient disc members; chains each having one end secured to said plate members and the other end adjustably secured to one of said cylinder heads, for limiting the extension of said spring means; guideways in the sides of said cylinder; guide members rigidly secured to said locomotive and positioned in said guideways, for permitting reciprocatory movement of said cylinder relative to said locomotive.

12. A shock absorbing device for a locomotive reach rod; said rod having a front portion and a rear portion; a cylinder having cylinder heads removably secured to the ends thereof; a piston slidably mounted in said cylinder; said rear portion secured for movement with one of said cylinder heads; said front portion passing through the other said cylinder head and secured for reciprocatory movement with said piston; spring means interposed between said piston and said cylinder heads; plates interposed between said spring means and said cylinder heads; means for adjusting the position of each of said plates; resilient disc members seated in the faces of said piston and plate members engaging said spring means and resilient disc members; chains each having one end secured to said plate members and the other end adjustably secured to one of said cylinder heads, for limiting the extension of said spring means; other spring means within the first said spring means; said other spring means secured to said adjustable plates.

13. A shock absorbing device for a locomotive reach rod; said rod having a front portion and a rear portion; a cylinder having cylinder heads removably secured to the ends thereof; a piston slidably mounted in said cylinder; said rear portion secured for movement with one of said cylinder heads; said front portion passing through the other said cylinder head and secured for reciprocatory movement with said piston; spring means interposed between said piston and said cylinder heads; plates interposed between said spring means and said cylinder heads; means for adjusting the position of each of said plates; resilient disc members seated in the faces of said piston and plate members engaging said spring means and resilient disc members; chains each having one end secured to said plate members and the other end adjustably secured to one of said cylinder heads, for limiting the extension of said spring means;

other spring means within the first said spring means; said other springs means secured to said adjustable plates; guideways in the sides of said cylinder; guide members rigidly secured to said locomotive and positioned in said guideways, for permitting reciprocatory movement of said cylinder relative to said locomotive.

14. A shock absorbing device for a locomotive reach rod; said rod having a front portion and a rear portion; a cylinder having cylinder heads removably secured to the ends thereof; a piston slidably mounted in said cylinder; said rear portion secured for movement with one of said cylinder heads; said front portion passing through the other said cylinder head and secured for reciprocatory movement with said piston; spring means interposed between said piston and said cylinder heads; plates interposed between said spring means and said cylinder heads; means for adjusting the position of each of said plates; resilient disc members seated in the faces of said piston and plate members engaging said spring means and resilient disc members; chains each having one end secured to said plate members and the other end adjustably secured to one of said cylinder heads, for limiting the extension of said spring means; means on one of said cylinder heads co-operating with means on the front portion of said reach rod for indicating when said piston is in the center of said cylinder.

15. A shock absorbing device for a locomotive reach rod; said rod having a front portion and a rear portion; a cylinder having cylinder heads removably secured to the ends thereof; a piston slidably mounted in said cylinder; said rear portion secured for movement with one of said cylinder heads; said front portion passing through the other said cylinder head and secured for reciprocatory movement with said piston; spring means interposed between said piston and said cylinder heads; plates interposed between said spring means and said cylinder heads; means for adjusting the position of each of said plates; resilient disc members seated in the faces of said piston and plate members engaging said spring means and resilient disc members; chains each having one end secured to said plate members and the other end adjustably secured to one of said cylinder heads, for limiting the extension of said spring means; other spring means within the first said spring means; said other spring means secured to said adjustable plates; guideways in the sides of said cylinder; guide members rigidly secured to said locomotive and positioned in said guideways, for permitting reciprocatory movement of said cylinder relative to said locomotive; other spring means within the first said spring means for cooperating with the first said spring means; piston rings on said piston; an air duct through said piston, and means for admitting air pressure to said cylinder.

16. A shock absorbing device for a rod divided into two portions; guide members for supporting said device in slidable engagement; a plurality of means secured in spaced relation to each other by guideways; said guideways adapted to be reciprocated on said guide members; one of said portions secured for movement with one of said means and the other portion secured to a member, yieldingly held equidistant from both of said means; and means for limiting the movement of said member.

17. A shock absorbing device for a rod divided into two portions; guide members for supporting said device in slidable engagement; a plurality of heads secured in spaced relation to each other by guideways adapted to be reciprocated on said guide members; one of said portions secured for movement with one of said heads and the other portion secured to a member yieldingly held equidistant from both of said heads; and means for limiting the movement of said member.

18. A shock absorbing device for a rod divided into two portions; guide members for supporting said device in slidable engagement; a plurality of heads secured in spaced relation to each other by guideways; said guideways adapted to be reciprocated on said guide members; one of said portions secured for movement with one of said heads and the other portion secured to a member adapted to reciprocate between said heads; shock absorbing means interposed between said member and said heads.

19. A shock absorbing device for a rod divided into two portions; guide members for supporting said device in slidable engagement; a plurality of heads secured in spaced relation to each other by guideways; said guideways adapted to be reciprocated on said guide members; one of said portions secured for movement with one of said heads and the other portion secured to a member adapted to reciprocate between said heads; shock absorbing means interposed between said member and said heads; means for limiting the range of action of said shock absorbing means.

20. A shock absorbing device for a rod divided into two portions; guide members for supporting said device in slidable engagement; a plurality of heads secured in spaced relation to each other by guideways; said guideways adapted to be reciprocated on said guide members; one of said portions secured for movement with one of said heads and the other portion secured to a member adapted to reciprocate between said heads; shock absorbing means interposed between said member and said heads; means for adjusting the force exerted by said shock absorbing means.

21. A shock absorbing device for a rod divided into two portions; guide members for supporting said device in slidable engagement; a plurality of heads secured in spaced relation to each other by guideways; said guideways adapted to be reciprocated on said guide members; one of said portions secured for movement with one of said heads and the other portion secured to a member adapted to reciprocate between said heads; shock absorbing means interposed between said member and said heads; means for indicating when said member is equidistant from said heads.

22. A shock absorbing device for a rod divided into two portions; guide members for supporting said device in slidable engagement; a plurality of heads secured in spaced relation to each other by guideways; said guideways adapted to be reciprocated on said guide members; one of said portions secured for movement with one of said heads and the other portion secured to a member adapted to reciprocate between said heads; shock absorbing means interposed between said heads and said member; means for adjusting the force exerted by said shock absorbing means; and means for limiting the range of action of said shock absorbing means.

23. A shock absorbing device for a rod divided into two portions; guide members for supporting said device in slidable engagement; a plurality of heads secured in spaced relation to each other by guideways; said guideways adapted to be reciprocated on said guide members; one of said portions secured for movement with one of said heads and the other portion secured to a member adapted to reciprocate between said heads; shock absorbing means interposed between said members and said heads; means for limiting the range of action of said shock absorbing means, and means for indicating when said member is equidistant from said heads.

In testimony whereof I have signed my name to this specification.

LAWRENCE S. WILBUR.